(12) United States Patent
Pizzi

(10) Patent No.: US 7,286,233 B2
(45) Date of Patent: Oct. 23, 2007

(54) SPECTROPHOTOMETER WITH MICRO-FILTERS

(75) Inventor: Marco Pizzi, Turin (IT)

(73) Assignee: CRF Societa Consortile per Azioni, Orbassano (Turin) (IT)

( * ) Notice: Subject to any disclaimer, the term of this patent is extended or adjusted under 35 U.S.C. 154(b) by 350 days.

(21) Appl. No.: 10/976,799

(22) Filed: Nov. 1, 2004

(65) Prior Publication Data
US 2005/0134855 A1 Jun. 23, 2005

(30) Foreign Application Priority Data
Dec. 23, 2003 (IT) .......................... TO2003A1034

(51) Int. Cl.
*G01N 21/25* (2006.01)
(52) U.S. Cl. ..................................... 356/419
(58) Field of Classification Search ................ 356/419
See application file for complete search history.

(56) References Cited

U.S. PATENT DOCUMENTS 5,570,180 A * 10/1996 Nagai .......................... 356/330
5,781,331 A * 7/1998 Carr et al. ................... 359/288
5,784,189 A 7/1998 Bozler et al.
6,191,860 B1 2/2001 Klinger et al.
2002/0163641 A1* 11/2002 Shroder ....................... 356/419

FOREIGN PATENT DOCUMENTS

| EP | 1 026 535 A2 * | 9/2000 |
| EP | 1 089 110 A2 | 4/2001 |
| EP | 1089110 A2 | 4/2001 |
| EP | 1 243 902 A1 | 9/2002 |
| EP | 1243902 A1 | 9/2002 |
| WO | WO 03/069593 A2 | 8/2003 |

OTHER PUBLICATIONS

Moseley et al. "Programmable 2-Dimensional Microshutter Arrays", 2000, Imaging the Universe in Three Dimensions: Astrophysics with Advanced Multi-Wavelength Imaging Devices, ASP Conference Series, pp. 1-4.*

* cited by examiner

*Primary Examiner*—Gregory J. Toatley, Jr.
*Assistant Examiner*—Kara Geisel
(74) *Attorney, Agent, or Firm*—Sughrue Mion Pllc.

(57) ABSTRACT

A spectrophotometer comprises selection means for selecting one or more of the components of a light beam corresponding to different wavelengths, formed by optical microfilters.

7 Claims, 3 Drawing Sheets

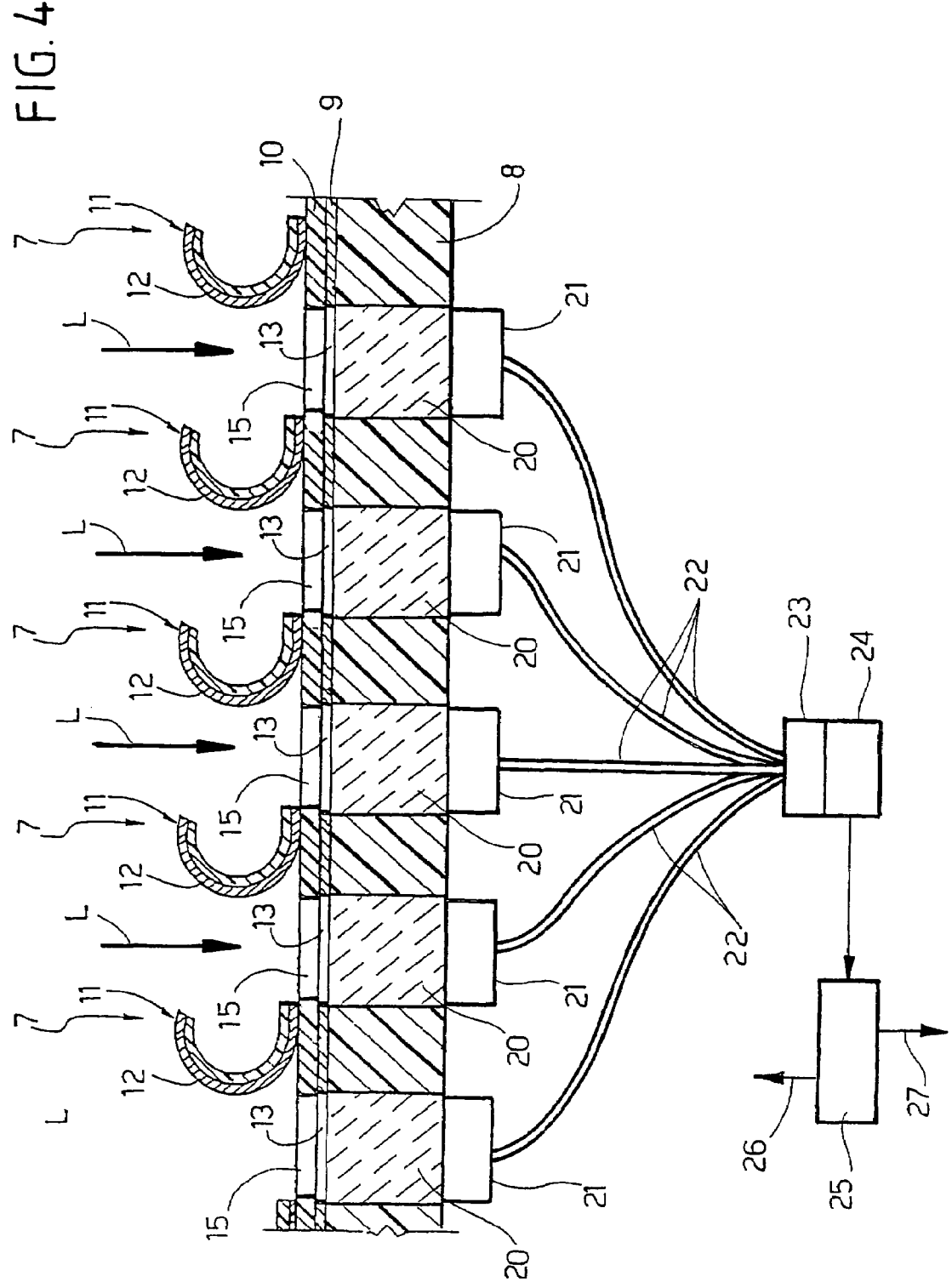

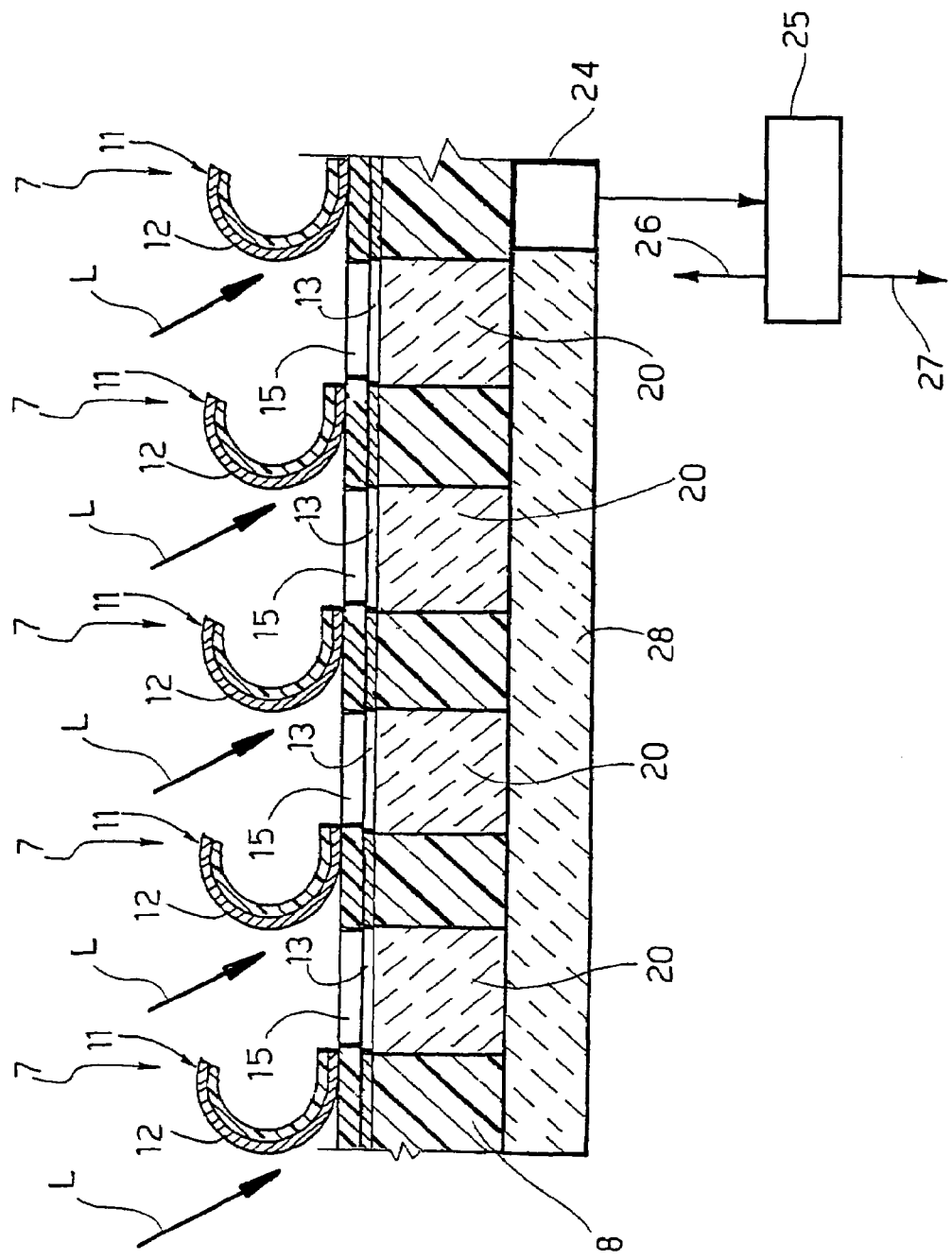

SPECTROPHOTOMETER WITH MICRO-FILTERS

BACKGROUND OF THE INVENTION

The present invention relates to the spectrophotometers.

The document EP 1 243 902 A1 in the name of the present applicant illustrates a spectrophotometer comprising:
- a light source;
- separator means, for separating the light beam coming from the source into various components corresponding to different wavelengths;
- selector means, for selecting one or more of the components of the light beam that are generated by said separator means; and
- sensor means for receiving the component selected by said selector means and for emitting at output electrical signals indicating the wavelength of the radiation received.

The spectrophotometer known from said document uses a separator element of any known type (for example a prism or a grating) to separate the light beam at output from the source into its components corresponding to the different wavelengths. The selection of one or more of the components of the light beam that are separated by means of said separator element is performed by means of an aligned set or a matrix array of electrostatic micro-shutters. The radiation selected by means of the electrostatic micro-shutters is made to converge on sensor means formed by a single sensor, for example a single photodiode, so as to avoid the high costs and complications of known solutions, which envisage sensor means formed by an array of photodiodes.

SUMMARY OF THE INVENTION

The purpose of the present invention is to propose a solution alternative to the known solution described above, which will be characterized by constructional simplicity, low production costs, and extremely small dimensions, with a view to favouring use thereof, for example, in applications such as the detection of the composition of the exhaust gases of the engine of a motor vehicle by means of a spectrophotometer provided on board said vehicle.

With a view to achieving the aforesaid purpose, the subject of the invention is a spectrophotometer presenting all the characteristics that have been referred to at the beginning of the present description and further characterized in that there are not envisaged means for splitting the light beam into the different wavelengths upstream of the selector means, the aforesaid separator means being formed only by a plurality of optical micro-filters that select different wavelengths.

The use of the micro-filters enables complete elimination of the need for the separator element (prism or grating) that was provided in the known solution referred to above, with consequent advantages of greater simplicity and smaller overall dimensions of the spectrophotometer.

According to a further preferred characteristic of the invention, the aforesaid selector means comprise a plurality of micro-shutters that can be actuated independently of one another.

Each of the aforesaid micro-filters is associated to a respective micro-shutter so as to obtain an extremely compact assembly, capable of selecting the wavelengths of interest without any need for additional elements for splitting the beam into its components, as in the case of the known solution. In one example of embodiment, the aforesaid optical micro-filters are of the interference type. Preferably, moreover, the aforesaid micro-filters are electrostatic micro-shutters.

In the case of the preferred embodiment, the electrostatic micro-shutters comprise a common substrate, an electrically conductive layer, functioning as common electrode, applied on a face of the substrate, an insulating layer, made of dielectric or ferro-electric material, set above the common electrode, and a plurality of separate thin-film electrodes, each having one end anchored to the insulating layer and the remaining part mobile between a position of rest, in which the electrode leaves free a passage for light through the substrate, and a position adherent to the substrate, in which the passage of light is obstructed.

Preferably, the aforesaid optical micro-filters are arranged within the substrate of the micro-shutters.

Also in the case of the present invention, the sensor means are preferably formed by a single sensor, preferably a pyro-electric sensor, or else a photodiode. There are provided electronic-control means for receiving and processing the signals at output from the sensor means and for controlling the electric power supply to the individual electrostatic micro-shutters for the purpose of selecting the wavelengths that are each time of interest.

According to a further important characteristic of the invention, there are provided means for conveying the radiation leaving the optical filters selected by means of the micro-shutters in the direction of the sensor means. Said guide means are formed, in a first example of embodiment, by a series of optical fibres that extends from the outputs of the micro-filters up to the aforesaid sensor means. There are of course provided coupling elements, of any known type, between the ends of the optical fibres and the optical micro-filters, on one side, and between the ends of the optical fibres and the sensor means, on the other.

In an alternative embodiment, the aforesaid means for guiding radiation from the filters selected to the sensor means are formed by a light-guide element that exploits phenomena of total inner reflection (T.I.R.). The same sublayer could function as light guide if a dielectric layer with appropriate index of refraction is deposited on the face opposite to that of the micro-shutters.

A further subject the invention is a method for controlling the spectrophotometer described above. According to the invention, between the selection of two different micro-filters performed by means of the micro-shutters there is introduced a dark phase, in which all the micro-shutters are closed. Alternatively, it is possible to open and close one and the same micro-shutter a number of times before passing on to the next one. In this way, it is not necessary to use an additional chopper, as required in the known solutions that make use of certain types of sensors.

BRIEF DESCRIPTION OF THE DRAWINGS

Further characteristics and advantages of the invention will emerge from the ensuing description with reference to the annexed drawings, which are provided purely by way of non-limiting example, and in which:

FIG. 4 is a schematic cross-sectional view of a first embodiment of the spectrophotometer according to the invention; and FIG. 5 is a schematic cross-sectional view of a second embodiment of the spectrophotometer according to the invention.

DETAILED DESCRIPTION OF THE INVENTION

Figure 1:
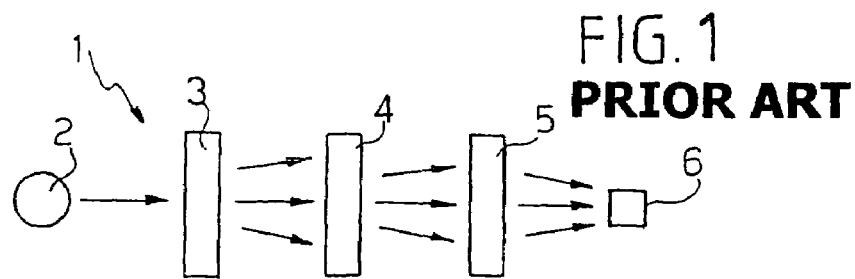
FIG. 1 is a schematic view of a spectrophotometer according to the known art illustrated in EP 1 243 902 A1.

With reference to FIG. 1, the reference number 1 designates, as a whole, a spectrophotometer of the type illustrated in the document EP 1 243 902 A1. The spectrophotometer 1 comprises a light source 2, and a separator element 3 of any known type, designed to separate the light beam leaving the source 2 into its components corresponding to the different wavelengths. Set downstream of the separator device 3 is an electrostatic micro-shutter device 4 that is illustrated in detail in what follows. Said device is designed for selecting a single desired wavelength in the beam emitted by the separator element 3. The radiation emitted is then made to converge by an optical element 5 on top of a single sensor 6, of any known type, for example a pyro-electric sensor or a photodiode, designed to emit at output an electrical signal that is a function of the light energy received.

Figure 2:
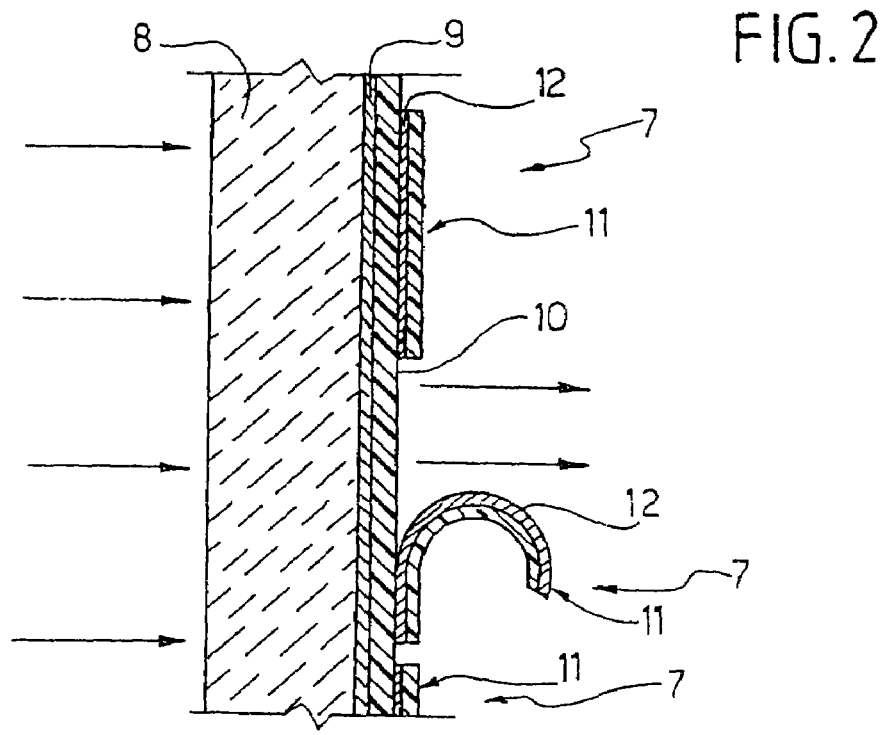
FIG. 2 is a partial cross-sectional view of a detail of an embodiment of the known spectrophotometer.

FIG. 2 illustrates an embodiment of the electrostatic micro-shutter device 4. According to said embodiment, there is provided an aligned set of mobile-petal micro-shutters 7, arranged on top of a substrate 8, for example formed by a transparent material, such as germanium, silicon, quartz or glass, having a thickness of a few millimeters or centimeters. Applied on top of the substrate 8 is a film 9 made of transparent conductive material, for example indium tin oxide (ITO), which has a thickness of a few tens or hundreds of nanometers and is obtained, for example, by means of vapour deposition, spin coating, silk-screen printing, or dipping. The film 9 constitutes a first electrode of the device, which is common to all the micro-shutters. It is coated with a layer of transparent insulating material 10, having a thickness, for example, of the order of a few micrometers, obtained with techniques similar to the ones adopted for the film 9. The layer 10 can be formed by a dielectric material, preferably tantalum oxide ($Ta_2O_5$) or by a ferro-electric material, for example lead zircono-titanate (PZT) or the like (e.g., lantanates). Set on top of the dielectric layer 10, in a plane orthogonal to the direction of the light beam, is an aligned series or a matrix array of mobile petals 11, each formed, for example, by a dielectric film, on which a metallized layer 12 functioning as second electrode is applied. Each petal 11 has one end secured to the layer 10 and, in its undeformed condition, assumes a curled-up configuration, in such a way as to enable passage of light through the respective portion of the substrate 8. The device comprises electric power supply means for applying a potential difference between the first electrode 9 and the second electrode 12 of a petal 11 selected. Following upon application of the voltage, the petal distends over the layer 10 adhering thereto by electrostatic effect, and consequently obstructing the passage of light through the respective portion of substrate. By controlling the electric power supply to the electrostatic micro-shutters 7 it is thus possible to select a single desired wavelength of the radiation leaving the separator element 3.

Figure 3:
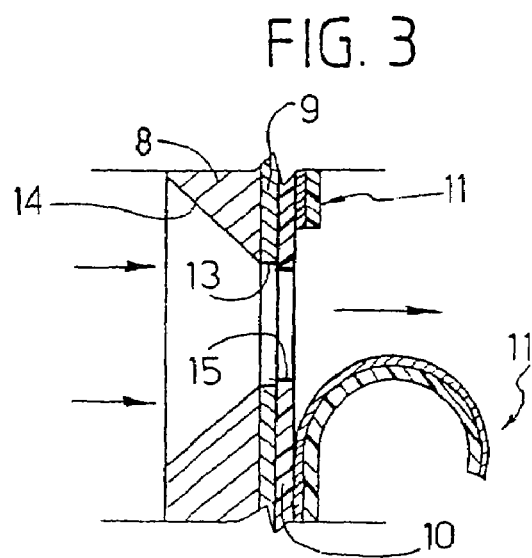
FIG. 3 illustrates a known variant of the spectrophotometer of FIG. 2.

FIG. 3 illustrates a variant in which the electrode 9 can be made of a low-cost non-transparent metal material, in which case there is provided a micro-window 13 in a position corresponding to each petal 11. Also the substrate 8 may be made of non-transparent material and have an opening 14 in a position corresponding to each petal. Finally, also the insulating layer 10 preferably has a hole 15 facing the openings 13, 14.

With reference now to FIG. 4, a first embodiment of the spectrophotometer according to the invention will be described. An important difference of the spectrophotometer according to the invention as compared to the known spectrophotometer illustrated in FIGS. 1-3, lies in the fact that the separation of the light beam leaving the source 2 into its components of different wavelength is obtained using a plurality of optical micro-filters, each designed to allow just one given wavelength of the light radiation to pass. In the case of FIG. 4, the optical filters, designated by the reference number 20, are arranged, according to an aligned arrangement or a matrix array, within the same substrate 8 of the set of electrostatic micro-shutters 7. The structure of the micro-shutters 7 may be altogether identical to the one illustrated in FIG. 2, and hence, in FIGS. 4, 5, parts corresponding to those illustrated in FIGS. 1-3 are designated by the same reference numbers. The micro-shutters 7 have an arrangement identical to that of the micro-filters 20 (aligned set or matrix array), in a plane orthogonal to the direction of the light beam L coming from the source (not visible in FIGS. 4 and 5). In the embodiment illustrated, the substrate 8 may be made of a non-transparent material, and the same applies to the layer of the electrode 9 and the insulating layer 10, in so far as the latter have the openings 13, 15 and define micro-windows in positions corresponding to each micro-filter 20. As has already been said, each micro-filter 20 is set within the substrate 8, i.e., it is mounted in a position corresponding to a through cavity made in the substrate, thus creating an extremely simple and compact structure. The outputs of the optical micro-filters 20 are connected by means of coupling elements 21, of any known type, to respective ends of optical fibres 22, the opposite ends of which converge in an optical-coupling element 23, which is also of any known type, for coupling with sensor means 24, of any known type, preferably formed by a single pyro-electric sensor or by a single photodiode, the output signals of which are sent to a processing and control unit 25, which also sends signals 26 for controlling the electric power supply to the various micro-shutters 7, for enabling selection of the desired wavelengths, and signals 27 to display means (not illustrated) for displaying the results of the processing operations.

In use, the control unit 25 carries out activation of the micro-shutters 7 for the purpose of selecting each time the desired wavelengths. Only the micro-shutter 7 that each time is in the open condition enables passage of light L, which undergoes filtering by the corresponding micro-filter 20. The corresponding optical fibre 22 hence conducts to the sensor 24 only the radiation having the desired wavelength. The signals at output from the sensor means 24 are sent to the control unit 25, which displays the results obtained.

As has already been mentioned above, preferably, between the opening of two different micro-shutters 7 there is left a dark phase, in which all the shutters are closed. Alternatively, it is possible to open and close one the same micro-shutter 7 a number of times before passing to the next one. In this way, it is not necessary to use an additional chopper, as required by some types of known sensors.

FIG. 5 illustrates an alternative embodiment, which differs from that of FIG. 4 only in the way in which the radiation leaving the micro-filters 20 are guided to the sensor 24. In this case, the optical-fibre system 22 of FIG. 4 is replaced by a single element 28 constituting a light guide, of type in itself known, designed to convey the light exploiting phenomena of total inner reflection (T.I.R.). The sensor 24 is, in this case, set at one end of the optical guide 28, with consequent further reduction of the dimensions of the overall device. For the purposes of a correct exploitation of the phenomena of total inner reflection, it is preferable for the light beam L directed onto the array of micro-shutters to have an inclination with respect to the direction orthogonal to the plane of the array of micro-shutters, as illustrated in FIG. 5.

As emerges clearly from the foregoing description, the fundamental advantage of the present invention as compared to the known solution described above lies in the fact that the need for a prism element upstream of the array of micro-shutters for splitting the beam into its components is eliminated completely, the selection made by the micro-shutters being obtained already on specific wavelengths of the radiation, thanks to the use of the micro-filters, with the consequence of a overall structure of the spectrophotometer that is more simple and more compact.

Of course, without prejudice to the principle of the invention, the details of construction and the embodiments may vary widely with respect to what has been described and illustrated herein purely by way of example, without thereby departing from the scope of the present invention.

What is claimed is:

1. A spectrophotometer, comprising:
   a light source;
   separator means for separating the light beam coming from the source into different components corresponding to different wavelengths;
   selector means for selecting one or more of the components of the light beam that are generated by said separator means;
   sensor means for receiving the component selected by said selector means and for emitting at output electrical signals indicating the wavelength of the radiation received;
   wherein said separator means are formed by a plurality of optical micro-filters, which can select different wavelengths; and
   said selector means comprise a plurality of micro-shutters, that can be actuated independently of one another, to which the aforesaid optical filters are respectively associated,
   so that the light beam is not split into the different wavelengths upstream of the selector means;
   said spectrophometer being such that:
   said micro-shutters are electrostatic micro-shutters;
   said electrostatic microshutters comprise: a common substrate; an electrically conductive layer functioning as a common electrode, applied on one face of the substrate; an insulating layer set on top of the common electrode; and a plurality of separate thin-film electrodes, each having one end anchored to the insulating layer and the remaining part mobile between a condition of rest, in which the electrode leaves free the passage of the light (L) through the substrate and an activated condition where it is adherent to the substrate, in which the passage of the light is obstructed;
   said filters are arranged within the aforesaid substrate;
   said sensor means comprise a single sensor formed by a pyro-electric sensor or a photodiode; and that
   there are provided guide means for guiding the radiation separated by said micro-filters towards said single sensor.

2. The spectrophotometer according to claim 1, wherein said guide means are formed by a series of optical-fibres, which extends from the outputs of the optical-filters up to the sensor means.

3. The spectrophotometer according to claim 2, wherein at the ends of each optical fibre there are provided optical-coupling means, for coupling, respectively, with an optical-filter and with the aforesaid sensor means.

4. The spectrophotometer according to claim 1, wherein said guide means include a light-guide element, which exploits the phenomenon of total inner reflection (T.I.R.).

5. The spectrophotometer according to claim 4, wherein said light guide means includes a plate set parallel to and adjacent to the arrangement of the aforesaid optical filters, with the sensor means arranged at one end of said plate.

6. The spectrophotometer according to claim 1, further comprising an electronic control for receiving and processing the signals output from said sensor means, for emitting output signals to means for displaying the results of the processing operation, and control signals for controlling electrical supply to the electrostatic micro-shutters.

7. The spectrophotometer according to claim 1, wherein the optical-filters are of an interference type.

* * * * *